United States Patent
Weinberger et al.

[11] Patent Number: 5,256,638
[45] Date of Patent: Oct. 26, 1993

[54] MAGNETICALLY LEVIATED SUPERCONDUCTING BEARING

[75] Inventors: Bernard R. Weinberger, Avon; Lahmer Lynds, Jr., Glastonbury, both of Conn.

[73] Assignee: United Technologies Corporation, Hartford, Conn.

[21] Appl. No.: 791,834

[22] Filed: Nov. 14, 1991

[51] Int. Cl.$^5$ ............................ H02K 7/09; G11B 5/55
[52] U.S. Cl. ........................................ 505/1; 310/90.5
[58] Field of Search ................ 310/90.5; 505/1, 700, 505/727, 903

[56] References Cited

U.S. PATENT DOCUMENTS

| | | | |
|---|---|---|---|
| 4,797,386 | 1/1989 | Gyorgy et al. | 505/1 |
| 4,843,504 | 6/1989 | Barnes | 310/10 |
| 4,870,310 | 9/1989 | Triplet | 310/74 |
| 4,886,778 | 12/1989 | Moon et al. | 506/1 |
| 4,926,082 | 5/1990 | Barnes | 310/90.5 |
| 4,939,120 | 7/1990 | Moon et al. | 505/1 |
| 4,956,571 | 9/1990 | Gordon et al. | 310/90.5 |
| 4,961,352 | 10/1990 | Downer et al. | 310/90.5 |
| 5,126,611 | 6/1992 | Armstrong et al. | 310/90.5 |
| 5,196,748 | 3/1993 | Rigney | 310/90.5 |

FOREIGN PATENT DOCUMENTS

| | | |
|---|---|---|
| 467341 | 1/1992 | European Pat. Off. |
| 90/03524 | 4/1990 | World Int. Prop. O. |
| 92/10871 | 6/1992 | World Int. Prop. O. |
| 92/21175 | 11/1992 | World Int. Prop. O. |

OTHER PUBLICATIONS

McMichael, "Effects of material processing in high temperature superconducting magnetic bearings", Apl. Phy. Ltr., vol. 59, No. 19, 4 Nov. 1991 pp. 2442–2444.

C. K. McMichael et al., Practical adaption in bulk superconduction magnetic bearing applications, 13 Apr. 1992, pp. 1893–1895.

Magnetic Forces in High-$T_c$ Superconducting Bearing, by F. C. Moon, published in Applied Electromagnetics in Materials, vol. 1 (1990) at pp. 29–35.

High-Speed Rotation of Magnets on High $T_c$ Superconducting Bearings, by F. C. Moon et al. published in Appl. Phys. Lett. vol. 56 (4), 22 Jan. 1990, at pp. 397–399.

"TCK/NSK Team Develop 'Attractive' High T Bearing," published in *Superconductor Week*, vol. 5, No. 36, Oct. 14, 1991 at p. 1; report of a superconducting magnetic bearing developed in Japan.

"Japanese High on Flywheels," published in *Superconductor Industry*, Fall 1991 at p. 38; report of magnetically levitated flywheels under development in Japan.

"Magnetic Bearing Model Using Yttrium-Based Superconductor," publication information unknown; report of a prototype magnetic bearing developed Japan.

"Characterization of High-Temperature Superconducting Bearing," by T. Yotsuya et al. publication information unavailable directed to a study of basic properties of a $YBa_2Cu_3O_x$ superconducting magnetic bearing.

Magnetic Levitation in a Cylindrical Superconductor, By T. Hasebe et al., published in International Journal of Applied Electromagnetics in Materials Jul. 1991 at pp. 221–225.

Superconducting Actuator Design, By M. Komori et al., published in International Journal of Applied Electromagnetics in Materials, Jul. 1991 at pp. 243–252.

*Primary Examiner*—Steven L. Stephan
*Assistant Examiner*—C. LaBalle
*Attorney, Agent, or Firm*—George J. Romanik

[57] ABSTRACT

A magnetically levitated superconducting bearing includes a magnet (2) mounted on a shaft (12) that is rotatable around an axis of rotation and a Type II superconductor (6) supported on a stator (14) in proximity to the magnet (2). The superconductor (6) is positioned so that when it is cooled to its superconducting state in the presence of a magnetic field, it interacts with the magnet (2) to produce an attractive force that levitates the magnet (2) and supports a load on the shaft (12). The interaction between the superconductor (6) and magnet(2) also produces surface screening currents (8) that generate a repulsive force perpendicular to the load. The bearing also has means for maintaining the superconductor at a temperature below its critical temperature (16, 18). The bearing could also be constructed so the magnet (2) is supported on the stator (14) and the superconductor (6) is mounted on the shaft (12). The bearing can be operated by cooling the superconductor (6) to its superconducting state in the presence of a magnetic field.

22 Claims, 3 Drawing Sheets

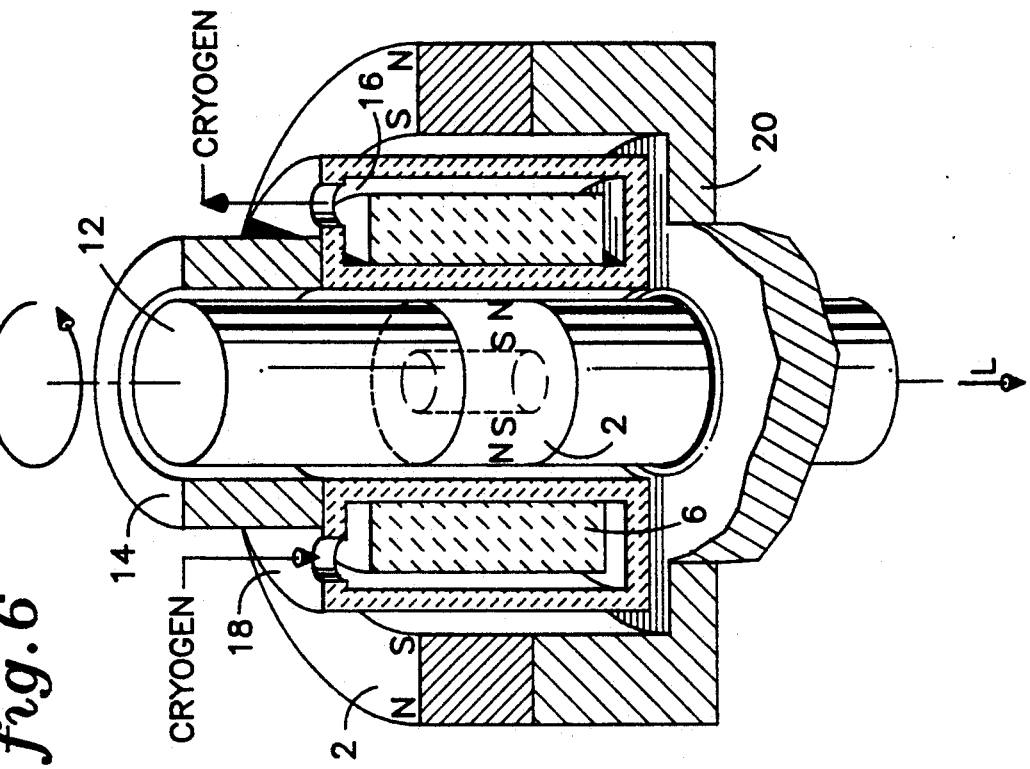
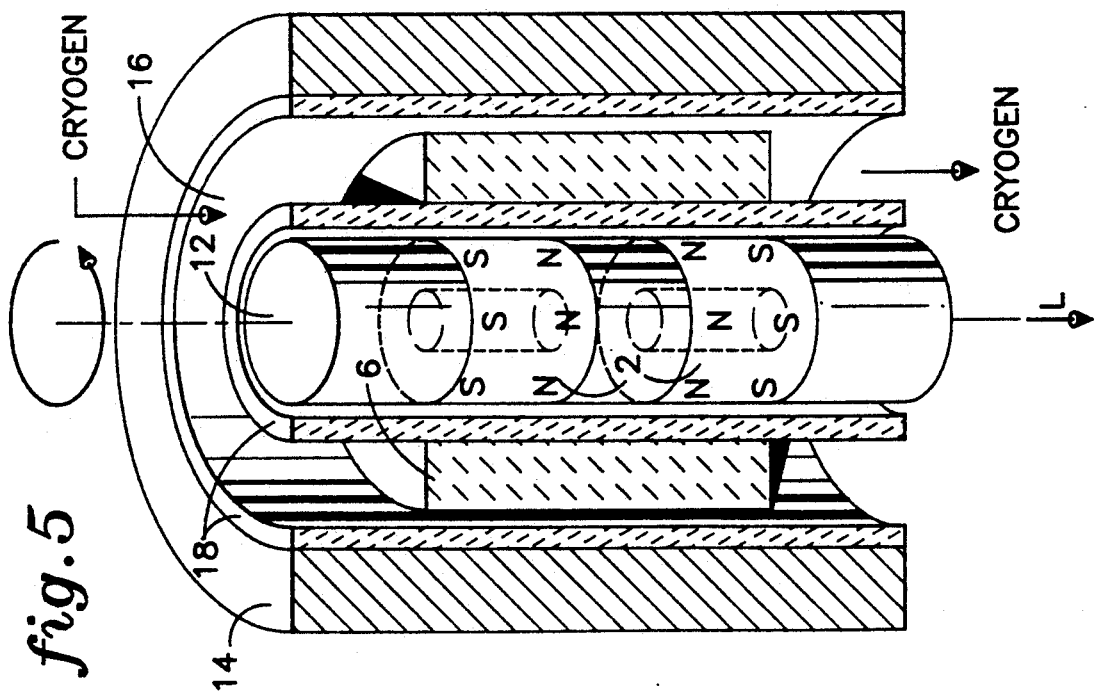

MAGNETICALLY LEVIATED SUPERCONDUCTING BEARING

This invention was made with Government support under Argonne National Laboratory Cooperative Research and Development Agreement ACK-85109 awarded by the Department of Energy. The Government has certain rights in this invention.

TECHNICAL FIELD

The present invention is directed to a magnetically levitated superconducting bearing.

BACKGROUND ART

A wide variety of bearings for rotating machinery, ranging from conventional bearings to noncontact bearings, are available. Conventional bearings, in which bearings physically contact a rotating device, are subject to many, well known problems. These problems include frictional energy losses and mechanical wear.

Noncontact bearings, such as magnet bearings, overcome problems with friction and mechanical wear, but introduce other problems. For example, permanent magnet bearings are inherently unstable. As a result, they require external mechanical means to stabilize them in at least one degree of freedom. Electromagnet bearings, on the other hand, can be made inherently stable with position sensors and electronic feedback control loops. The electromagnets in the bearings, however, require a power source and a means for cooling their windings. As a result, electromagnet bearings can be impractical for many applications.

Superconductor bearings have been proposed as improvements to permanent magnet and electromagnet bearings. Early superconductor levitation experiments incorporated Type I superconductors, which are perfectly diamagnetic in their superco states. This means that external magnetic fields (H) less than a critical field ($H_c$) that are applied to Type I superconductors induce magnetic fields in the superco that are exactly opposite to the external fields ($H<H_c$). For example, an external magnetic field poled north-south (N-S) induces a field poled S-N that repels the external field. Similar behavior can be observed in Type II superconductors that are exposed to external magnetic fields less than a lower critical field ($H_{c1}$)($H<H_{c1}$). External magnetic fields between $H_{c1}$ and an upper critical field ($H_{c2}$) can also induce a measurable, though diminished, repulsive force in Type II superconductors ($H_{c3}<H<H_{c2}$).

Type I superconductor bearings use the repulsive force between the oppositely poled magnetic fields to levitate a magnet that is part of a rotating shaft. Because all known Type I superconductors are superconductors only below about 21 K, they require liquid helium for cooling. The drawbacks of liquid helium cooling, such as cost, are well known.

Recently, bearings with Type II superconductors have been proposed. Type II superconductors can generate larger induced magnetic fields than Type I superconductors because they have larger critical fields than Type I superconductors. Therefore, Type II superconductors are potentially more useful in bearings than Type I superconductors. U.S. Pat. Nos. 4,886,778 and 4,939,120, both to Moon et al., describe several Type II superconductor bearings. The Moon et al. bearings use the repulsive force between a Type II superconductor and an applied magnetic field to levitate a magnet that is part of a rotating shaft. FIG. 1 shows how these bearings work with an applied magnetic field below $H_{c1}$ ($H<H_{c1}$). A magnet 2 applies a magnetic field, represented by dashed lines 4, to a superconductor 6. The magnetic field 4 induces surface screening currents, represented by arrows 8, in the superconductor 6. The surface screening currents 8 preduce a magnetic field opposite to the applied field 4. This is indicated by the N-S poling on the magnet 2 and S-N poling on the superconductor 6. The opposite fields repel each other and produce a force $F_r$ that levitates magnet 2 to support the force L. Unlike Type I superconductors, the repulsive force $F_r$ in Type II superconductors can be offset by an attractive force $F_a$, shown in FIG. 2, that can be induced in the superconductor by trapped magnetic fields. The net force, $F_r-F_a$, exerted by a Type II superconductor bearing depends on the way the superconductor was cooled to its superconducting state.

A Type II superconductor can be cooled to its superconducting state under a zero field cooled (ZFC) protocol or a field cooled (FC) protocol. Under a ZFC protocol, the superconductor is cooled without being exposed to a magnetic field. When an external magnetic field is later applied to the ZFC superconductor, the applied field generates the surface screening currents and repulsive force shown in FIG. 1. ($H<H_{c1}$). If the applied field is smaller than $H_{c1}$, the ZFC superconductor behaves like a Type I superconductor. If the applied field is larger than $H_{c1}$, a magnetic flux poled parallel to the applied field penetrates the superconductor in the form of fluxons ($H_{c1}<H<H_{c2}$). The fluxons are represented by arrows 10, which are circulating supercurrents that support the magnetic field contained in the fluxons. For example, an applied field that is poled N-S, as shown, produces fluxons that are also poled N-S. As a result, there is an attractive force $F_a$ between the fluxons and applied field that offsets the repulsive force $F_r$. If the superconductor has a high density of strong pinning centers, the fluxons will be pinned near the surface of the superconductor. Pinning centers are defects in the superconductor capable of pinning fluxons in a particular position. The fluxons pinned at the surface of the superconductor inhibit other fluxons from entering the superconductor. As a result, the attractive force $F_a$ in a ZFC superconductor can be small compared to the repulsive force $F_r$ at field strengths above $H_{c1}$. Therefore, the net force, $F_r-F_a$, in a ZFC superconductor can be strong enough to support a load at most field strengths below $H_{c2}$.

Under the field cooled (FC) protocol, the superconductor is cooled in the presence of an applied magnetic field. During cooling, some of the field is trapped as fluxons at pinning centers in the superconductor. This creates a situation similar to the one shown in FIG. 2 For a FC superconductor, though, the FIG. 2 situation prevails for all applied magnetic fields below $H_{c2}$ rather than just between $H_{c1}$ and $H_{c2}$ as with a ZFC superconductor. The fluxons trapped during a FC protocol are dispersed throughout the superconductor rather than trapped at the surface as in a ZFC protocol. The trapped fluxons produce a field density that is nearly equal in magnitude, but opposite in sign, to that produced by the surface screening currents. As a result, the net magnetization on a FC superconductor can be close to zero and the attractive force $F_a$ can substantially offset the repulsive force $F_r$. Therefore, the net force, $F_r-F_a$, in a FC superconductor can be too small to support a significant load.

Because the net force generated by FC superconductors can be low, the Moon et al. bearings should be built with ZFC superconductors. ZFC superconductors, however, can be impractical for many applications because they require the superconductors to be cooled without being exposed to magnetic fields. For example, if a Moon et al. bearing uses permanent magnets, the superconductors in the bearings must be shielded from the magnets during cooling. This can be done by removing the magnets from the bearing while the superconductors are cooled and later replacing them. Such a procedure, though, is impractical for most applications. If a Moon et al. bearing has electromagnets rather that permanent magnets, the electromagnets can be shut off, rather than removed, during cooling. Electromagnets, however, require a power source and means for cooling the magnets' coils. These requirements can make Moon et al. bearings that have electromagnets less desirable as well.

Therefore, what is needed is a Type II superconductor bearing that can be cooled to its superconducting state in the presence of an external magnetic field.

DISCLOSURE OF THE INVENTION

The present invention is directed to a Type II superconductor bearing that can be cooled to its superconducting state in the presence of an external magnetic field.

One aspect of the invention includes a magnetically levitated superconducting bearing with a magnet mounted on a shaft that is rotatable around an axis of rotation and a Type II superconductor supported on a stator in proximity to the magnet. The superconductor is positioned so that, when it is cooled to its superconducting state in the presence of a magnetic field, it interacts with the magnet to produce a non canceled attractive force that levitates the magnet and supports a load on the shaft The interaction between the superconductor and magnet also produces surface screening currents that generate a repulsive force perpendicular to the load. The bearing also has means for maintaining the at a temperature below its critical temperature.

Another aspect of the invention includes a bearing similar to the one described above in which the magnet is supported on the stator and the superconductor is mounted on the shaft. In this embodiment, the interaction between the superconductor and magnet levitates the superconductor to support a load on the shaft.

Another aspect of the invention includes a method of operating one of the magnetically levitated superconductor bearings described above in which a Type II superconductor in the bearing is cooled to its superconducting state in the presence of a magnetic field.

These and other features and advantages of the present invention will become more apparent from the following description and accompanying drawings.

BRIEF DESCRIPTION OF THE DRAWINGS

FIG. 5 is a perspective view of a thrust bearing of the present invention.

FIG. 6 is a perspective view of an alternate embodiment of a thrust bearing of the present invention.

BEST MODE FOR CARRYING OUT THE INVENTION

Figure 1:
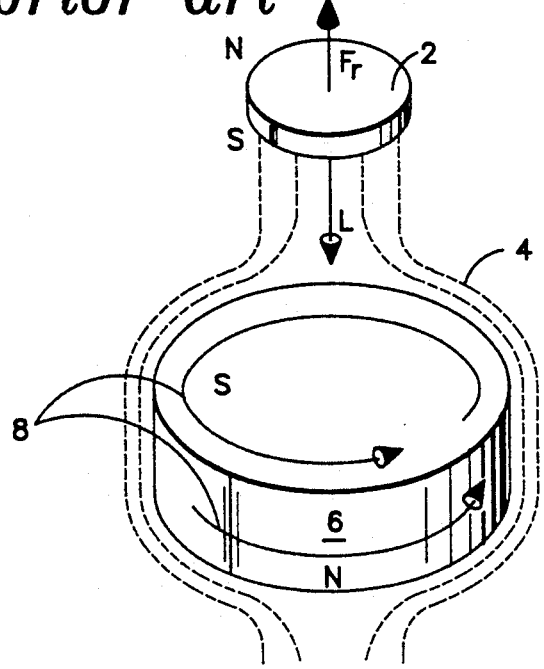
FIG. 1 is a diagram that shows how a magnet and a zero field cooled (ZFC) Type II superconductor interact at applied magnetic fields (H) below the lower critical field ($H_{c1}$) ($H<H_{c1}$). This is identical to the interaction between a magnet and a Type I superconductor at all applied magnetic fields below the critical field ($H_c$)($H<H_c$).
Figure 2:
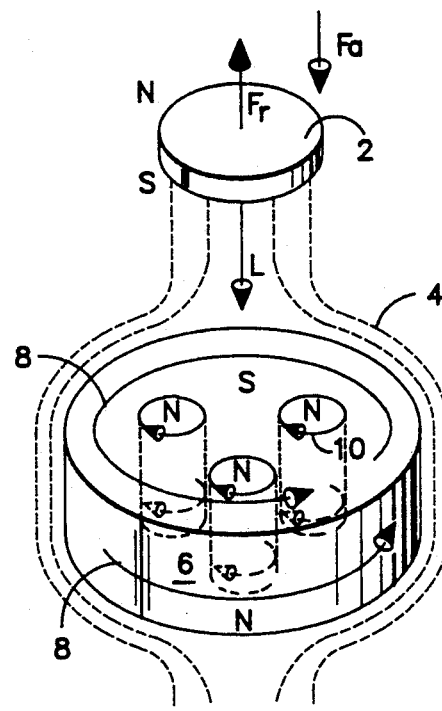
FIG. 2 is a diagram that shows how a magnet and a ZFC Type II superconductor interact at applied magnetic fields between $H_{c1}$ and the upper critical field ($H_{c2}$)($H_{c1}<H<H_{c2}$). This is similar to the interaction between a magnet and a field cooled (FC) Type II superconductor of all applied magnetic fields below $H_{c2}(H<H_{c2})$.
Figure 3:
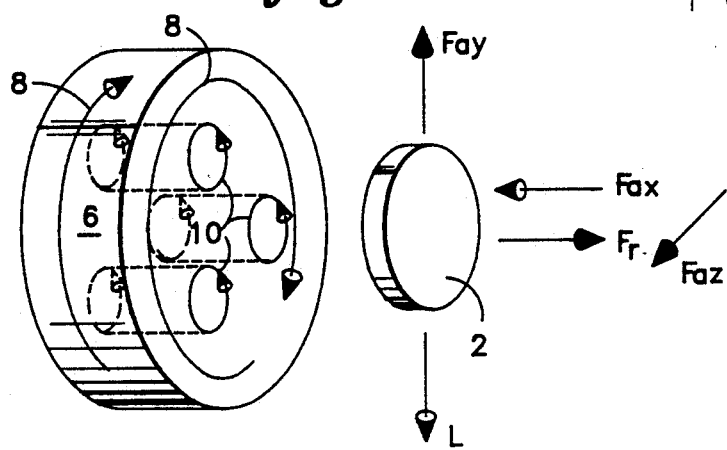
FIG. 3 is a diagram that shows how a magnet and a FC Type II superconductor interact in the present invention. As in FIG. 2, the applied magnetic field is below $H_{c2}(H<H_{c2})$.

The bearings of the present invention use the attractive force $F_a$ generated by fluxons pinned in a field cooled (FC) Type II superconductor to support a load on a shaft. As shown in FIG. 3, the fluxons 10 are pinned in the superconductor 6 when it is cooled to its superconducting state in the presence of the magnetic field from the magnet 2. The interaction between the magnet 2 and superconductor 6 is similar to the field cooled interaction shown in FIG. 2 because in both cases the magnet's field (H) is below the superconductor's upper critical field ($H_{c2}$)($H<H_{c2}$). The key difference between FIGS. 2 and 3 is the orientation of the magnet 2 and superconductor 6 relative to a load L. The effect of the forces produced by the interaction of the magnet 2 and superconductor 6 on the load L is explained below. Preferably, the magnet 2 will be fixed in space relative to the superconductor 6, for example, with a suitable mechanical support, while the superconductor 6 is cooled. After cooling, the mechanical support should be removed so the magnet 2 is supported only with forces generated by the superconductor 6. The attractive force $F_a$ on the magnet has components in the x-, y-, and z-axes. These components will be designated $F_{ax}$, $F_{ay}$, and $F_{az}$, respectively. The force component $F_{ax}$ acts on the magnet 2 along the x-axis. The other two force components, $F_{ay}$ and $F_{az}$, become apparent when the magnet 2 is displaced by a load L along the y- and z-axes relative to the pinned fluxons 10. Because the fluxons 10 are pinned, they cannot follow the movement of the magnet 2. Therefore, they exert the forces $F_{ay}$ and $F_{az}$ to restore the magnet 2 to its equilibrium position. The equilibrium position is the position the magnet 2 was in relative to the superconductor 6 when the superconductor was cooled to its superconducting state. The magnet 2 also induces surface screening currents 8 that produce a repulsive force $F_r$ directed along the x-axis. The repulsive force $F_r$ substantially cancels the x-axis component of the attractive force $F_{ax}$ when the magnet 2 and superconductor 6 are in equilibrium. The repulsive force $F_r$, however, does not have corresponding y- or z-axis components because the screening currents 8 are not pinned, as are the fluxons 10. Therefore, the screening currents 8 follow the magnet 2 as it moves along the y- or z-axes. Because there is no corresponding repulsive force to cancel the y- and z-axis attractive forces, $F_{ay}$ and $F_{az}$, these attractive forces, $F_{ay}$ and $F_{az}$, can levitate the magnet 2 to support the load L.

Although the repulsive force $F_r$ cancels the x-axis attractive force $F_{ax}$ when the magnet 2 and superconductor 6 are in equilibrium, these forces can provide some stability along the x-axis if the magnet 2 is displaced along the x-axis. For example, if the magnet 2 moves away from the superconductor 6, the repulsive force $F_r$ decreases, allowing the attractive force $F_{ax}$ to dominate. As a result, the magnet 2 will be pulled toward the superconductor 6. The converse happens when the magnet 2 moves closer to the superconductor 6. The repulsive force $F_r$ increases and becomes dominant. The magnet 2 is then pushed away from the superconductor 6.

Figure 4:
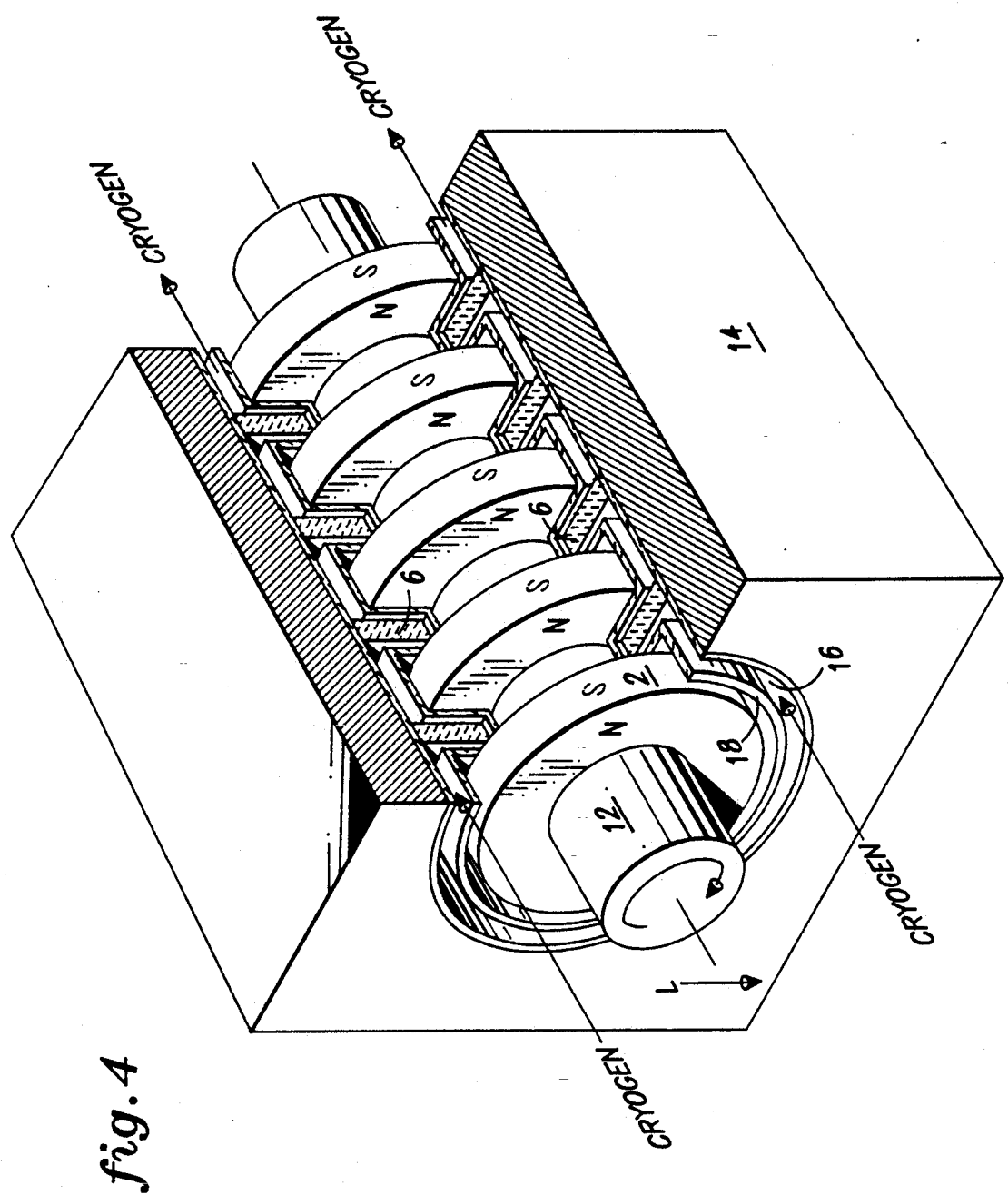
FIG. 4 is a perspective view of a journal bearing of the present invention.

FIG. 4 shows how the uncancelled attractive forces are used in a journal bearing of the present invention. The journal bearing supports a load L directed radially along a shaft 12. The load L can be the weight of a rotating device attached to the shaft 12 or some other force that produces a radial load. A plurality of magnets 2 are mounted to the shaft 12 so that they rotate with the shaft. To minimize friction caused by dragging fluxons through the superconductors 6, the magnets 2 should be magnetically symmetrical with respect to the shaft's axis of rotation. For example, the magnets 2 can be symmetrically-poled ring magnets as shown. A stator 14 supports a plurality of Type II superconductors 6 in proximity to the magnets 2. The superconductors 6 may, for example, be ring-shaped bodies having a bore through which the shaft 12 passes. The superconductors 6 should be positioned so the magnet 2 can induce surface screening currents in the superconductors when the superconductors are cooled to their superconducting state. The superconductors 6 also should be oriented so the repulsive force $F_r$ generated by the surface screening currents is perpendicular to the load. In this orientation, one component of the attractive force $F_a$ is also perpendicular to the load. This attractive force component cancels the repulsive force $F_r$ when the magnets 2 and superconductors 6 are in equilibrium. At least one of the other two components of the attractive force $F_a$ is parallel to the load L. These attractive force components levitate the magnets 2 to support the load L. Preferably, the magnets 2 will be arranged to concentrate the magnetic flux that penetrates the superconductors 2 to enhance the density of the fluxons trapped during cooling. This can be done by positioning a magnet 2 on either side of each superconductor 6. The bearing also has a duct 16 positioned between the magnets 2 and superconductors 6 that directs a cryogen to the superconductors 6 to cool them. The cryogen may be any material capable of cooling the superconductors 6 to their superconducting state. A thermal barrier 18 insulates the duct 16 and superconductors 6. Any other means that can cool the superconductors 6 to their superconducting state also can be used.

FIGS. 5 and 6 show two embodiments of thrust bearings of the present invention. The thrust bearings support loads directed axially along the shaft 12. As in the journal bearing, the magnets 2 and superconductors 6 in the thrust bearings are oriented to provide a noncanceled component of the attractive force $F_a$ parallel to the load L. The magnets 2 are arranged to concentrate the magnetic flux that penetrates the superconductors 2 to enhance the density of the fluxons trapped during cooling. In FIG. 5, this is done by positioning two oppositely poled magnets 2 axially along the shaft 12 in proximity to the superconductors 6. In FIG. 6, this is done by positioning a ring magnet 2 on either side of the superconductor 6. One magnet 2 is on the shaft 12. A second magnet 2 is on a rotor 20 that is attached to the shaft 12. If desired, the magnet on the rotor 20 can be replaced with a piece of soft iron that will be magnetized by the magnet 2 on the shaft 12. In both FIGS. 5 and 6, the superconductor 6 is a ring-shaped body having a bore through with the shaft 12 passes. The superconductor 6 is positioned inside an annular duct 16 such that a cyrogen flowing through the duct cools the superconductor.

A bearing of the present invention is operated by cooling the superconductors 6 to their superconducting state in the presence of a magnetic field. Preferably, the magnetic field will be generated by the magnets 2 in the bearing so the bearing can be cooled after it is assembled. The shaft 12 should be supported during cooling to ensure that the magnets 2 and superconductors 6 are properly aligned. After the superconductors 6 have been cooled, the means used to support the shaft 12 can be removed.

The superconductors in bearings of the present invention can be any Type II superconductors. Preferably, the superconductors will have a critical temperature above 77 K so they can be cooled to their superconducting state with liquid nitrogen. If another cryogen is used, the superconductors' critical temperature should be higher than the cryogen's boiling point. For example, if liquid oxygen is the cryogen, the superconductor should have a critical temperature higher than 90 K. Suitable superconductors include Y-Ba-Cu-O, Bi-Sr-Ca-Cu-O, Tl-Ba-Ca-Cu-O, and similar materials. Bi-Sr-Ca-Cu-O materials in which Pb is substituted for a portion of the Bi are also suitable. The superconductor can be made with any known method and can be either a bulk material or a thin film. Methods that produce superconductors with a high density of strong pinning centers are especially desirable. Preferably, the superconductor will be melt processed. As is known, melt processing includes partially melting the superconductor and recrystallizing it under a controlled temperature gradient. Melt processed superconductors have large crystals and a high density of strong, directionally oriented pinning centers. Such superconductors should be positioned in the bearings so their oriented flux pinning centers enhance pinning strength.

The bearings of the present invention are suitable for a wide variety of applications and provide several benefits over the prior art. For example, because the bearings must be cooled in the presence of a magnetic field, they can be fully assembled when cooled. By contrast, prior art superconductor bearings cannot be cooled in the presence of magnetic fields. In addition, because the bearings of the present invention rely on attractive forces generated by pinned fluxons, they can potentially operate in larger fields and support larger loads than prior art superconductor bearings that rely on repulsive forces generated by surface screening currents. Both of these improvements occur because the density of pinned fluxons, hence the strength of the attractive force, increases with larger applied fields up to $H_{c2}$. By contrast, the strength of the repulsive force at applied fields above $H_{c1}$ is increasingly offset at larger applied fields by the increasing strength of the attractive force.

In addition to the configurations described above, the bearings of the present invention may have many other configurations. For example, the superconductors 6 can be mounted on the shaft 12 and the magnets 2 can be mounted on the stator 14. Also, a journal bearing and a thrust bearing can be mounted on the same shaft to support both radial and axial loads. Those skilled in the art will appreciate that the noncanceled attractive forces can be in any axis as long as the repulsive force is perpendicular to load and noncanceled attractive forces are parallel to the load.

The invention is not limited to the particular embodiments shown and described herein. Various changes and modifications may be made without departing from the spirit or scope of the claimed invention.

We claim:

1. A magnetically leviated superconducting bearing, comprising:
   (a) a shaft rotatable around an axis of rotation, wherein the shaft is subject to a load,
   (b) a magnet mounted to the shaft,
   (c) a stator in proximity to the shaft,
   (d) a Type II superconductor supported by the stator in proximity to the magnet such that when the superconductor is cooled to its superconducting state in the presence of a magnetic field, the magnet and superconductor interact with each other to produce a noncanceled attractive force parallel to the load that leviates the magnet and supports the load, the surface screening currents that generate a repulsive force perpendicular to the load that is canceled by a component of the attractive force perpendicular to the load, wherein the magnet and superconductor are oriented to enhance the magnetic field to which the superconductor is exposed, and
   (e) means for maintaining the superconductor at a temperature below its critical temperature.

2. The bearing of claim 1, wherein the load is perpendicular to the axis of rotation.

3. The bearing of claim 1, wherein the load is parallel to the axis of rotation.

4. The bearing of claim 1, wherein the magnet is rotatable with the shaft and is magnetically symmetrical with respect to the axis of rotation.

5. The bearing of claim 1, wherein the superconductor is a melt processed superconductor that has a plurality of directionally oriented fluxon pinning centers.

6. The bearing of claim 1, wherein the bearing has a plurality of magnets interleaved with a plurality of superconductors to enhance the magnetic field to which the superconductor is exposed.

7. The bearing of claim 6, wherein each superconductor has a first side and a second side and a magnet is positioned on each side of the superconductors.

8. The bearing of claim 6, wherein the magnets are symmetrically-poled ring magnets and the superconductors are ring-shaped bodies having a bore through which the shaft passes.

9. The bearing of claim 8, wherein a duct defined by a thermal barrier is positioned between the magnets and superconductors such that a cryogen flowing though the duct cools the superconductors.

10. The bearing of claim 1, wherein the bearing has a pair of magnets oriented so they are oppositely poled to enhance the magnetic fields to which the superconductor is exposed.

11. The bearing of claim 10, wherein both magnets are positioned axially along the shaft.

12. The bearing of claim 11, wherein the superconductor is positioned inside an annular duct such that a cryogen flowing through the duct cools the superconductor.

13. The bearing of claim 10, wherein one magnet is positioned on the shaft and a second magnet is positioned on a rotor attached to the shaft such that the magnets are positioned on either side of the superconductor.

14. The bearing of claim 10, wherein the superconductor is a ring-shaped body having a bore through with the shaft passes.

15. A magnetically leviated superconducting bearing, comprising:
   (a) a shaft rotatable around an axis of rotation, wherein the shaft is subject to a load,
   (b) a stator in proximity to the shaft,
   (c) a magnet supported by the stator,
   (d) a Type II superconductor mounted to the shaft in proximity to the magnet such that when the superconductor is cooled to its superconducting state in the presence of a magnetic field, the magnet and superconductor interact with each other to produce a noncanceled attractive force parallel to the load that leviates the superconductor and supports the load, and surface screening currents that generate a repulsive force perpendicular to the load that is canceled by a component of the attractive force perpendicular to the load, wherein the magnet and superconductor are oriented to enhance the magnetic field to which the superconductor is exposed, and
   (e) means for maintaining the superconductor at a temperature below its critical temperature.

16. The bearing of claim 15, wherein the load is perpendicular to the axis of rotation.

17. The bearing of claim 15, wherein the load is parallel to the axis of rotation.

18. The bearing of claim 15, wherein the superconductor and magnet are symmetrical with respect to the axis of rotation and the superconductor is rotatable with the shaft.

19. The bearing of claim 15, wherein the superconductor is a melt processed superconductor that has a plurality of directionally oriented fluxon pinning centers.

20. The bearing of claim 15, wherein the bearing has a plurality of magnets interleaved with a plurality of superconductors to enhance the magnetic field to which the superconductor is exposed.

21. The bearing of claim 20, wherein each superconductor has a first side and a second side and a magnet is positioned on each side of the superconductors.

22. The bearing of claim 15, wherein the bearing has a pair of magnets oriented so they are oppositely poled to enhance the magnetic fields to which the superconductor is exposed.

* * * * *